US010435270B2

(12) United States Patent
Ma

(10) Patent No.: US 10,435,270 B2
(45) Date of Patent: Oct. 8, 2019

(54) LIGHT BULB STORAGE CONTAINER AND DISPLAY

(71) Applicant: SLIS, Inc., Darien, IL (US)

(72) Inventor: Jiadong Ma, Darien, IL (US)

(73) Assignee: SLIS, Inc., Darien, IL (US)

( * ) Notice: Subject to any disclaimer, the term of this patent is extended or adjusted under 35 U.S.C. 154(b) by 0 days.

(21) Appl. No.: 15/836,146

(22) Filed: Dec. 8, 2017

(65) Prior Publication Data

US 2018/0229960 A1 Aug. 16, 2018

Related U.S. Application Data

(60) Provisional application No. 62/458,629, filed on Feb. 14, 2017.

(51) Int. Cl.
*B65H 75/02* (2006.01)
*B65D 43/02* (2006.01)
(Continued)

(52) U.S. Cl.
CPC ............ *B65H 75/02* (2013.01); *A45C 11/00* (2013.01); *B01F 3/1214* (2013.01); *B01F 3/223* (2013.01);
(Continued)

(58) Field of Classification Search
CPC ............ B65H 75/02; B65H 2701/3915; B65D 47/12; B65D 43/0225; B65D 2251/06; B65D 2525/28; B65D 2251/1041; B65D 85/42; B65D 51/18; B65D 2251/0006; B65D 43/169; B65D 43/18; B65D 47/122; B25H 75/02; B25H 75/362; B25H 2701/3915
(Continued)

(56) References Cited

U.S. PATENT DOCUMENTS 4,176,756 A * 12/1979 Gellman ............... B65D 51/002
215/274
4,657,139 A * 4/1987 Hanifl .................. A61M 5/3205
206/366
(Continued)

OTHER PUBLICATIONS

LED Water Faucet LEDMO, https://www.amazon.com/gp/product/B01L6MMFBC/ref=oh_aui_detailpage_o02_s00?ie=UTF8&psc=1, Feb. 2, 2018, 6 pgs.
(Continued)

*Primary Examiner* — Jacob K Ackun
*Assistant Examiner* — Jenine Pagan
(74) *Attorney, Agent, or Firm* — Greenberg Traurig, LLP

(57) ABSTRACT

An apparatus that may be used for the display and storage of decorative lights is disclosed. The apparatus may include a housing that includes a hollow body portion defining an interior and a substantially cylindrical neck portion that defines an axis that extends into the body portion, the neck portion further defining an opening for accessing the interior. The apparatus may further include a lid assembly configured to be removably coupled with the housing. The lid assembly may include a fixed portion configured to be removably coupled with the housing, and a movable portion movably coupled with the fixed portion. The movable portion may move from an open configuration to a closed configuration to alter the size of an opening provided through the lid assembly.

15 Claims, 8 Drawing Sheets

(51) Int. Cl.
| | |
|---|---|
| B65D 47/12 | (2006.01) |
| A45C 11/00 | (2006.01) |
| B65H 75/36 | (2006.01) |
| C01B 32/354 | (2017.01) |
| B01F 3/12 | (2006.01) |
| B01F 3/22 | (2006.01) |
| B01F 15/00 | (2006.01) |
| C01B 33/12 | (2006.01) |

(52) U.S. Cl.
CPC .... *B01F 15/0024* (2013.01); *B01F 15/00824* (2013.01); *B65D 43/0225* (2013.01); *B65D 47/122* (2013.01); *B65H 75/362* (2013.01); *C01B 32/354* (2017.08); *C01B 33/12* (2013.01); *B01F 2003/1278* (2013.01); *B01F 2215/0036* (2013.01); *B65D 2251/06* (2013.01); *B65D 2251/1041* (2013.01); *B65D 2525/28* (2013.01); *B65H 2701/3915* (2013.01)

(58) Field of Classification Search
USPC ........ 206/420, 419, 418, 457, 409; 220/212, 220/213, 254.1, 244, 254.3, 254.4, 254.6, 220/288, 315, 376, 324
See application file for complete search history.

(56) References Cited

U.S. PATENT DOCUMENTS

| | | | | |
|---|---|---|---|---|
| 5,201,419 A * | 4/1993 | Hayes | ................. | B65D 85/676 206/389 |
| 5,228,632 A * | 7/1993 | Addison | ............ | A47K 10/3827 206/409 |
| 5,244,113 A * | 9/1993 | Stymiest | .............. | B65D 51/242 215/228 |
| 5,323,517 A * | 6/1994 | Su | ............................ | A61J 11/04 24/20 EE |
| 6,371,938 B1 * | 4/2002 | Reilly | ............... | A61M 5/14546 128/DIG. 1 |
| 6,467,623 B1 * | 10/2002 | Lewis | ..................... | A47F 5/025 206/388 |
| 7,959,036 B2 * | 6/2011 | Koh | ......................... | B65D 1/32 215/43 |
| 7,992,745 B2 * | 8/2011 | Sellars | ............... | A47K 10/3818 206/223 |
| 2004/0251163 A1 * | 12/2004 | Conde | ................ | B65D 83/0805 206/494 |
| 2014/0231297 A1 * | 8/2014 | Berger | ................... | B65D 85/70 206/494 |
| 2014/0367400 A1 * | 12/2014 | Crudge | .............. | A47K 10/3818 221/1 |
| 2016/0075463 A1 * | 3/2016 | Hollander | .............. | B65D 81/36 206/457 |

OTHER PUBLICATIONS

Soledi LED Water Stream Tap Glow Shower Head Faucet Light, https://www.amazon.com/gp/product/B00PZBTLGI/ref=oh_aui_detailpage_o02_s00?ie=UTF8&psc=1, Feb. 2, 2018, 7 pgs.
LEDMO LED Shower Head, https://www.amazon.com/gp/product/B01L6N1SKU/ref=oh_aui_detailpage_o02_s01?ie=UTF8&psc=1, Feb. 2, 2018, 8 pgs.
2 LED Water Blaster Guns, https://www.amazon.com/Water-Blaster-Flashing-Colorful-Lights/dp/B075JYP2CF/ref=sr_1_2?s=toys-and-games&ie=UTF8&qid=1517599322&sr=1-2&keywords=light+up+water+splash, Feb. 2, 2018, 6 pgs.
Tidal Storm Light-Up Water Blaster, https://www.amazon.com/Tidal-Storm-Light-Up-Blaster-Completely/dp/B06ZZXKK6Y/ref=sr_1_1?s=toys-and-games&ie=UTF8&qid=1517599322&sr=1-1&keywords=light+up+water+splash, Feb. 2, 2018, 6 pgs.
Led Water Spray Gun, https://www.alibaba.com/product-detail/led-water-spray-gun-novelty-pool_60404180666.html, Feb. 2, 2018, 18 pgs.
Bubble Ray Gun (Toy), http://www.tobar.co.uk/bubble-ray-gun, Feb. 2, 2018, 2 pgs.

* cited by examiner

US 10,435,270 B2

LIGHT BULB STORAGE CONTAINER AND DISPLAY

CROSS-REFERENCE TO RELATED APPLICATION

This application claims priority to U.S. provisional application No. 62/458,629, filed on Feb. 10, 2017.

FIELD OF THE DISCLOSURE

The present disclosure relates generally to illuminable decorative storage containers.

BACKGROUND

Storage containers generally include a main storage portion and a lid that can be affixed to the main storage portion of the container so as to completely enclose an interior of the main storage portion. For example, storage containers may include a generally prism-shaped body and a matching lid that snaps on to or is otherwise attachable to the body. In other examples, some storage containers include a lid that is attached to the body of the container via a hinge, where the axis of the hinge does not extend through the body of the container and is generally perpendicular to a central or other axis of the body.

SUMMARY

An apparatus for the display and/or storage of decorative lights or other objects may include a housing and a lid assembly. The housing may include a hollow body portion defining an interior, and a neck portion extending from an upper end of the body portion, the neck portion defining an axis that extends into the body portion, the neck portion further defining a housing opening for accessing the interior. The lid assembly may be configured to be removably coupled with the housing and may include a fixed portion configured to be removably coupled with the housing, and a movable portion movably coupled with the fixed portion. The movable portion may be movable relative to the fixed portion from an open configuration to a closed configuration. The lid assembly may define a lid opening, in both the open and closed configuration, that is contiguous with the housing opening and provides access to the interior when the lid assembly is coupled with the housing. The opening may be larger in the open configuration than in the closed configuration.

DETAILED DESCRIPTION

Figure 1:
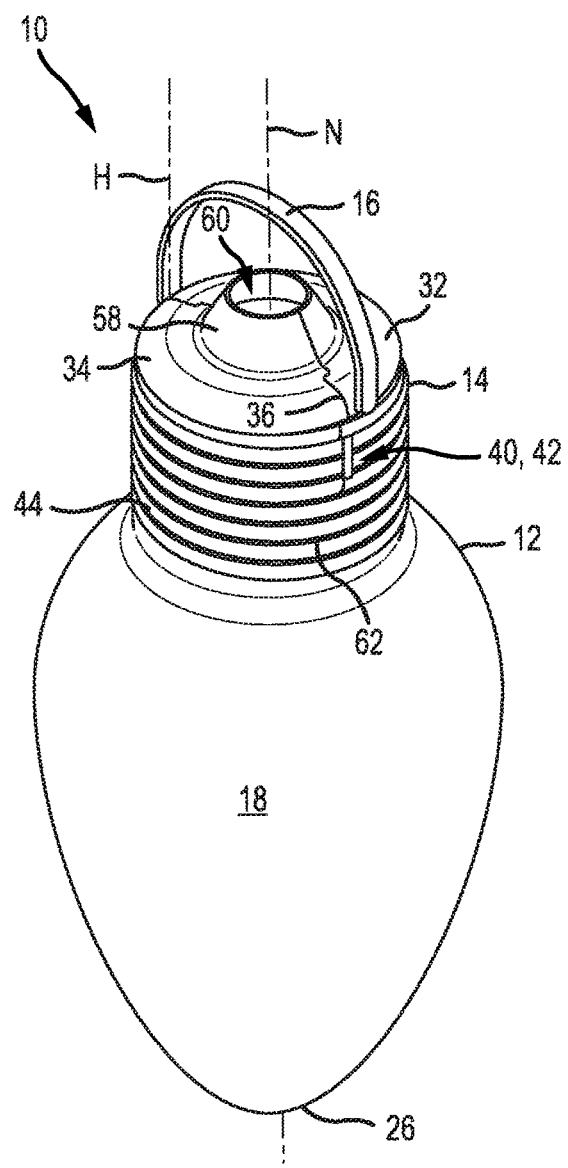
FIG. 1 is a perspective view of an example light bulb storage container and display.
Figure 2:
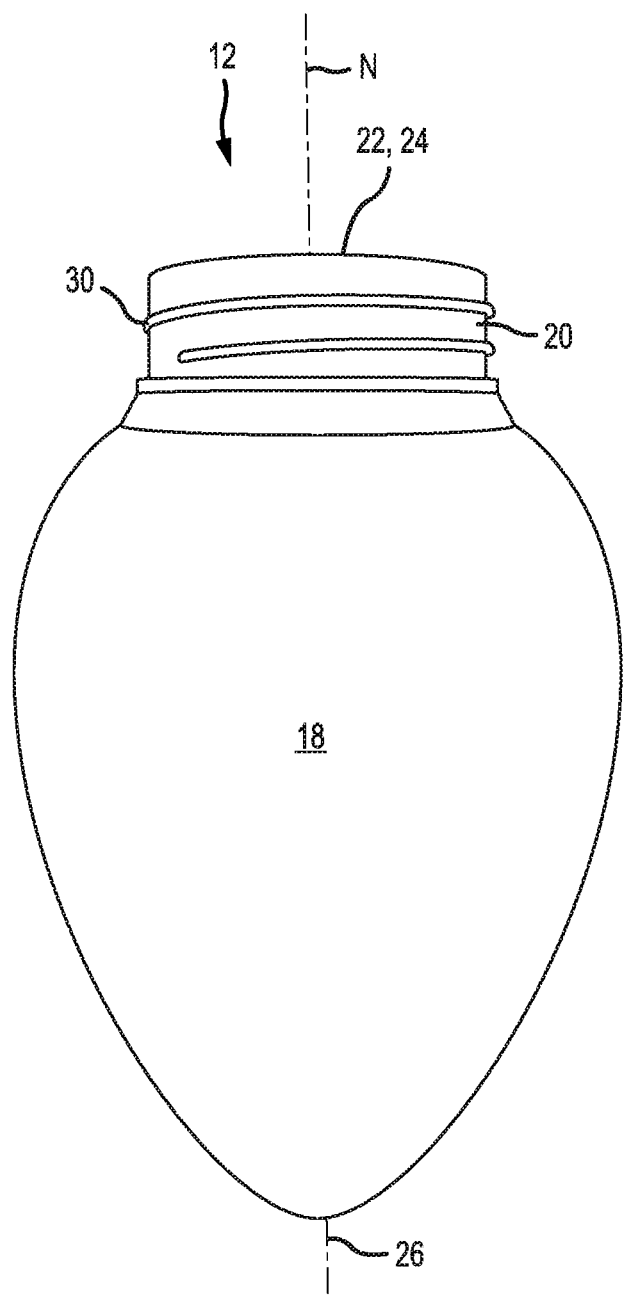
FIG. 2 is a perspective view of an example housing of the example light bulb storage container and display.

The following description of an example apparatus is not intended to limit the scope of the description to the precise form or forms detailed herein. Instead the following description is intended to be illustrative so that others may follow its teachings.

Referring to the figures, in which like reference numerals refer to the same or similar features in the various views, FIGS. 1-7 illustrate an example embodiment of a storage container and display apparatus 10, and portions of the apparatus 10. The apparatus 10 may find use, for example, in the storage and display of decorative electric lights, as will be described in greater detail below.

The apparatus 10 may include a housing 12, a lid assembly 14 that is configured to be removably coupled with the housing 12, and a handle 16 that is coupled with the lid assembly 14. In an embodiment, one or both of the housing 12 and the lid assembly 14 may be made of a plastic material (e.g., via plastic injection molding or other plastic manufacturing processes). In an embodiment, the housing 12 may be at least partially transparent or translucent (e.g., the housing 12 may at least permit transmission of light through the walls of the housing 12) so that one or more electric lights that are illuminated while inside the housing 12 (e.g., using an exterior power source) may cause the housing 12 to glow, or may be seen through the housing.

The housing 12 may include a hollow body portion 18 and a substantially cylindrical neck portion 20, in an embodiment. The hollow body portion 18 may define an interior 22. The neck portion 20 may extend from an upper end of the body portion 18 and may define an opening 24 for access to the interior 22.

The size of the housing 12 may vary from embodiment to embodiment. In some embodiments, the housing 12 may be between 2 inches and 10 inches in diameter. Regardless of the particular implementation, the housing 12 may be large enough such that the interior 22 within the housing 12 can fit seasonal or holiday lights, such as a strand of lights, therein. For example, in some embodiments, the interior 22 may have a volume of between a quarter of a gallon and a gallon. Various sizes may be used, depending on the desired ornamental effect and/or desired storage capacity of the apparatus 10. It should be understood the present disclosure encompasses housing 12 of any size, shape, or dimension.

Figure 3:
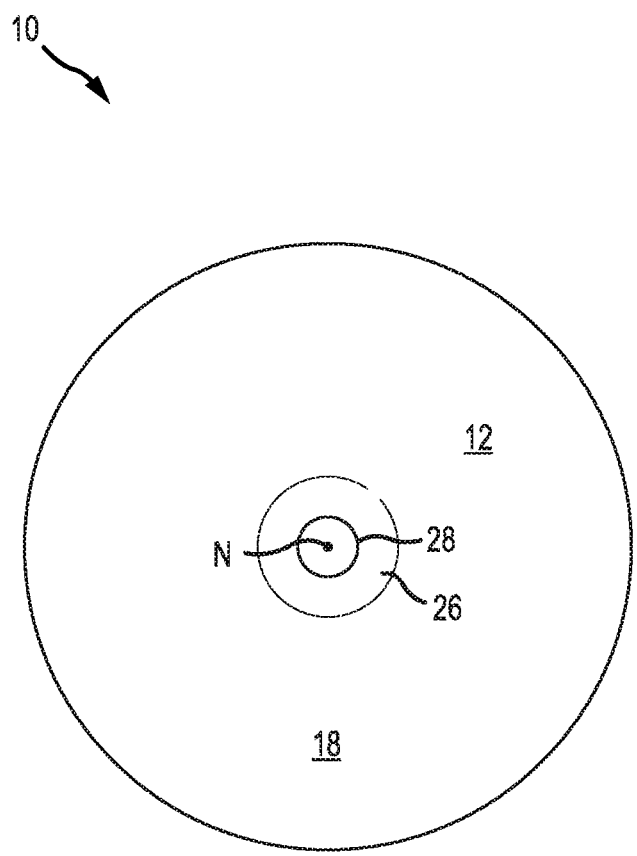
FIG. 3 is a bottom view of the example light bulb storage container and display.

The housing body portion 18 may be generally ovoidal in shape, in an embodiment. For example, the housing body portion 18 may be shaped to resemble a decorative light bulb as attached to a strand, in embodiments. A lower portion 26 of the body portion 18 may define one or more apertures 28 for the drainage of moisture or fluid (e.g., rainfall) from the interior of the body portion. In an embodiment, a single aperture 28 may be provided in the center of the lower portion 26 of the body portion 18, as illustrated in FIG. 3. In other embodiments, other quantities and/or positions of apertures 28 may be provided. The lower portion 26 may be shaped, and the one or more apertures 28 may be arranged, so as to encourage drainage of fluid from the interior 22. For example, the lower portion 26 of the body portion 18 may be generally conical in shape, in an embodiment, with the aperture 28 at a center of the lower portion 26.

The neck portion 20 may include a mating structure 30 that may mate with a corresponding mating structure on the lid assembly 14. In an embodiment, the mating structure 30 may be or may include a threaded portion 30. The opening 24 defined by the neck portion 20 may be configured in size and shape to accommodate the passage of a portion of a strand of lights that is partially disposed within the housing 12. The neck portion 20 and the body portion 18 of the housing 12 may be made from a single type of material, in an embodiment. The neck portion 20 may have a diameter between 1 inch and 5 inches, in embodiments. Various sizes may be used, depending on the desired ornamental effect and/or desired strand storage capacity of the apparatus 10.

The neck portion 20 may define an axis N that extends through the neck portion 20 and into the body portion 18 of the housing 12. The axis N may be defined at the geometric center of the neck portion 20, in embodiments. The neck portion 20 may be radially symmetric about the neck axis N, in some embodiments. In other embodiments, the neck portion 20 may not be radially symmetric about the neck axis N. The neck axis N may extend through the aperture 28 in the body portion, in an embodiment.

The lid assembly 14 may include a fixed portion 32 and a movable portion 34, in an embodiment. The fixed portion 32 may be fixed in position with respect to the housing 12 when the lid assembly 14 is affixed to the housing 12, and the movable portion 34 may be movable with respect to the housing 12 and/or with respect to the fixed portion 32 when the lid assembly 14 is affixed to the housing 12, in an embodiment. The fixed portion 32 may be separated from the movable portion 34 along a seam 36, in an embodiment. The seam 36 may substantially bisect the lid assembly 14, in an embodiment.

The movable portion 34 may be movably coupled with the fixed portion 32. For example, in an embodiment, the movable portion 34 may be hingedly coupled with the fixed portion 32, that is, coupled with the fixed portion 32 via a hinge 38. The hinge 38 may be a living hinge (e.g., formed from a partially-cut region of plastic), in embodiments. In other embodiments, the hinge 38 may be a separate structure. The hinge 38 may define a hinge axis H about which the movable portion 34 pivots between a closed configuration and an open configuration. The hinge axis H may be substantially parallel to the axis N defined by the neck portion 20 of the housing 12 when the lid assembly 14 is coupled with the housing 12, in an embodiment.

Figure 4:
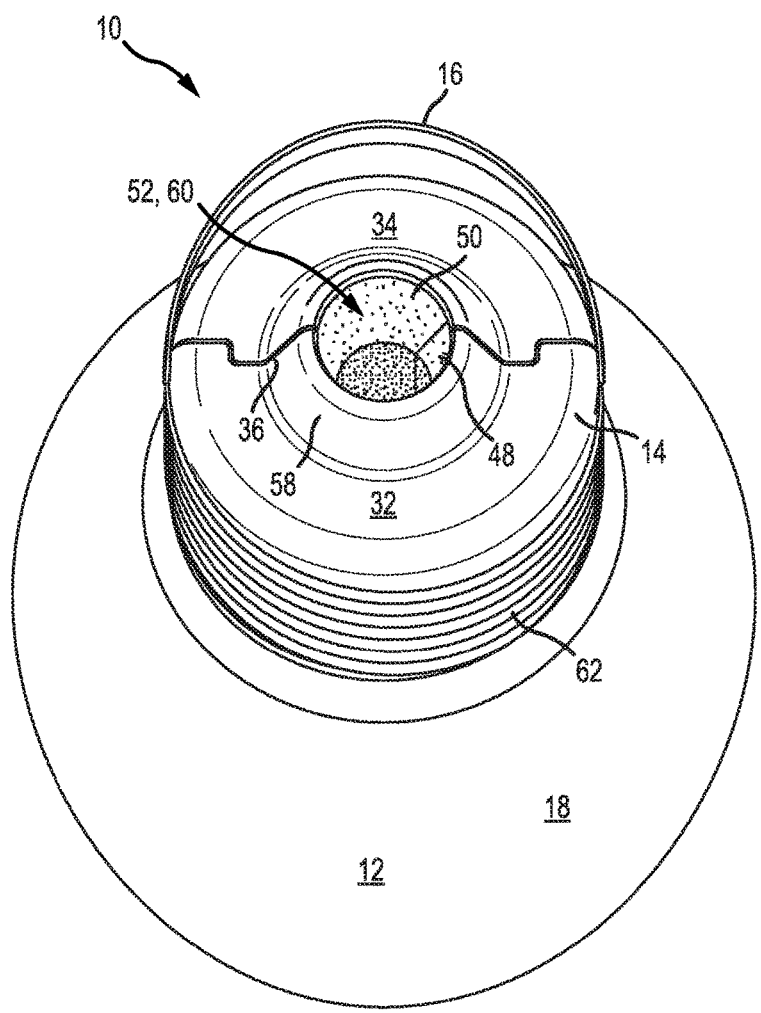
FIG. 4 is a perspective view of an example lid assembly of the example light bulb storage container and display.
Figure 5:
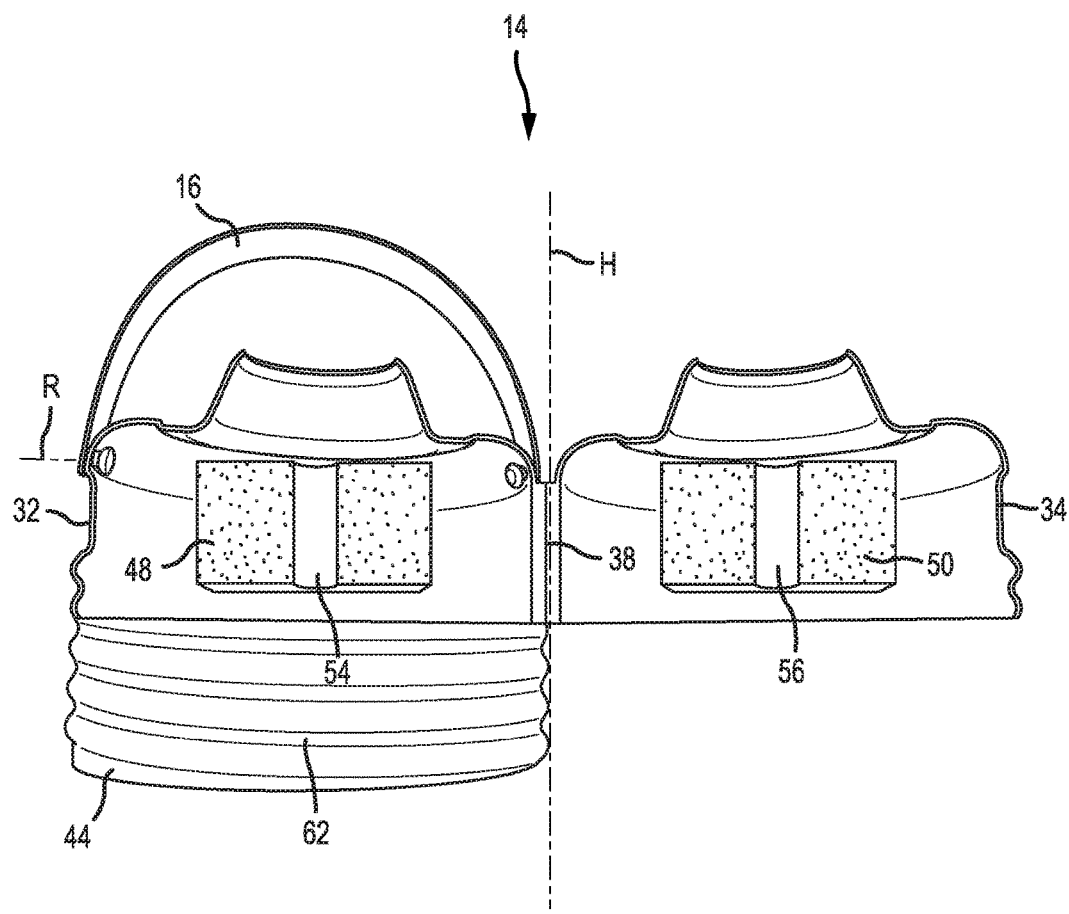
FIG. 5 is a side view of the example lid assembly in a fully open configuration.
Figure 6:
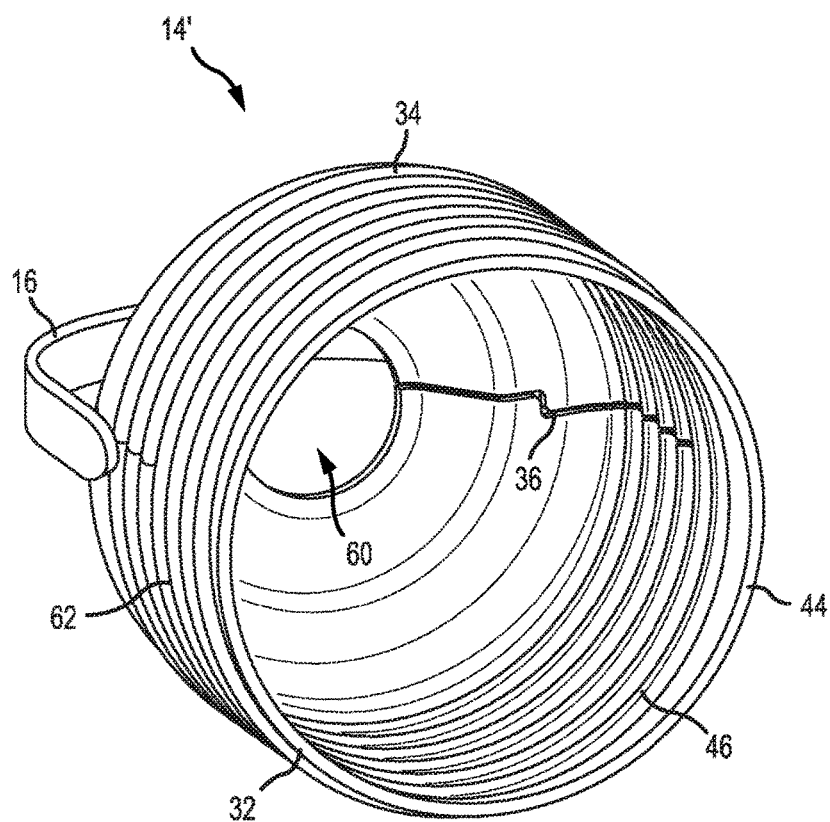
FIG. 6 is a perspective underside view of a second embodiment of the example lid assembly.
Figure 7:
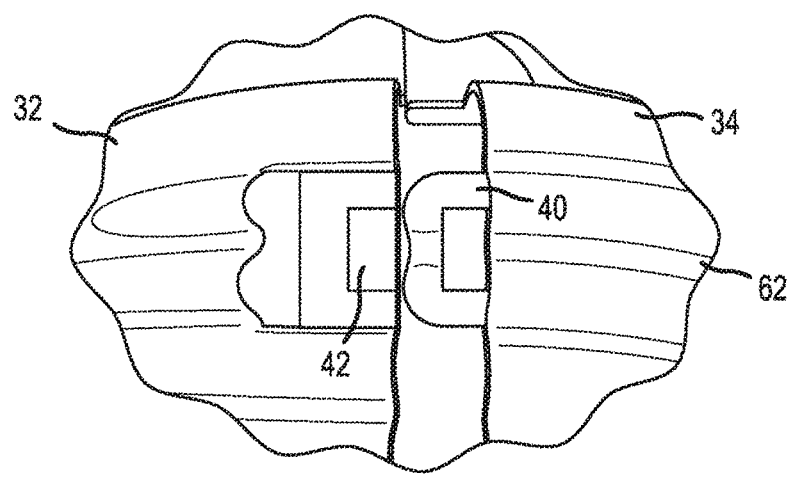
FIG. 7 is a close-up view of an example clasp of the example light bulb storage container and display.

The lid assembly 14 may further include a clasp 40 and a protrusion 42, where the clasp 40 mates with the protrusion 42 so as to secure the movable portion 34 to the fixed portion 32 in a closed configuration (illustrated in FIGS. 1, 4, and 6). The clasp 40 may be removed from the protrusion 42 so as to move the movable portion 34 and place the lid assembly in an open configuration (illustrated in FIG. 5; FIG. 7 illustrates a partially-open configuration). In embodiments, the clasp 40 may be disposed on or defined by the movable portion 34, and the protrusion 42 may be disposed on or defined by the fixed portion 32. In other embodiments, the clasp 40 may be disposed on or defined by the fixed portion 32, and the protrusion 42 may be disposed on or defined by the movable portion 34. In embodiments, the clasp 40 may mate with a recess, instead of or in addition to a protrusion 42, provided in the lid assembly 14.

The fixed portion 32 of the lid assembly 14 may include a lower portion 44 that includes a mating structure 46 that complements the mating structure 30 on the neck portion 20 of the housing 12. In an embodiment, the mating structures 30, 46 may be or may include complementary threaded portions. Accordingly, in an embodiment, a threaded portion 46 of the lid assembly 14 may be configured to operably engage with a corresponding threaded portion 30 on the housing 12.

The lid assembly 14 may be substantially cylindrical in shape and have a size that allows the lid threading 46 to engage with the housing threading 30, thereby removably coupling the lid assembly 14 to the housing 12. In an embodiment, the fixed portion 32 of the lid assembly 14 may include a semi-cylindrical portion, and the movable portion 34 of the lid assembly may be semi-cylindrical.

The lid assembly 14 may further include a first piece of compressible material 48 secured to an inner surface of the fixed portion 32 of the lid assembly 14 and a second piece of compressible material 50 secured to an inner surface of the movable portion 34 of the fixed assembly 14. The first and second pieces of compressible material 48, 50 may collectively define an aperture 52 that provides access to the interior 22 when the lid assembly 14 is in a closed position, in an embodiment. Accordingly, in an embodiment, the first piece of compressible material 48 may include a first concave portion 54, and the second piece of compressible material 50 may include a second concave portion 56, and the first and second concave portions 54, 56 may collectively define the aperture 52 that provides access to the interior 22 of the housing 12 when the lid assembly 14 is coupled with the housing 12. The aperture 52 may be contiguous with the opening 24 of the neck portion 20, in an embodiment. The aperture 52 may be sized and shaped to allow the passage of an electric light strand, in an embodiment. The neck axis N may extend through the aperture 52 when the lid assembly 14 is coupled with the housing 12, in an embodiment.

The pieces of compressible material 48, 50 may form a gasket, in an embodiment. In the depicted example light bulb storage display 10, the gasket is formed from two pieces of compressible foam 48, 50. However, other materials may be used to construct the gasket. For example, the gasket may be formed as a piece of plastic either secured to or formed from the lid assembly.

In an embodiment, the gasket may be intended to seal the interior 22 of the housing 12 from entry of foreign materials, after insertion of a light bulb strand—i.e., may be intended to seal around a light strand. In other embodiments, the gasket may be intended not to fluidly seal around a light strand.

In an embodiment, the lid assembly 14 may omit the gasket. For example, FIG. 6 illustrates a second embodiment of a lid assembly 14', in which the gasket is not provided.

When in a closed position, the lid assembly 14 may include a conical frustum at a top portion 58 of the lid assembly 14. The top portion 58 of the lid assembly 14 may define an opening 60 that provides access to the interior 22 of the housing 12 when the lid assembly 14 is coupled to the housing 12, in an embodiment.

The lid assembly 14 may include one or more ridges 62 on an exterior surface of the lid assembly 14, in an embodiment. The one or more ridges 62 may provide a user with improved grip when holding the apparatus 10, in an embodiment. In addition, the one or more ridges 62 may be configured in size and shape to resemble the screw threads and base of a light bulb in appearance, in an embodiment.

In an embodiment, the lid assembly 14 may define a lid opening, in both the open and closed configurations, that is contiguous with the housing opening 24 and provides access to the interior 22 when the lid assembly 14 is coupled with the housing 12. The opening may be defined by the lower portion of the fixed portion 32 of the lid assembly in the open configuration and by the aperture 52 and lid opening 60 in the closed configuration, in an embodiment. Accordingly, the lid assembly 14 may provide an opening that is larger in the open configuration than it is in the closed configuration, though the closed configuration still may provide an opening for access to the interior 22 of the housing 12.

The handle 16 may be rotatably coupled to the lid assembly along a rotation axis R. The rotation axis R may be substantially perpendicular to the axis N of the neck portion and/or to the hinge axis H, in embodiments. The handle 16 may be joined to the lid assembly 14 with rivets, pins, or other mechanical coupling means, in embodiments.

Figure 8:
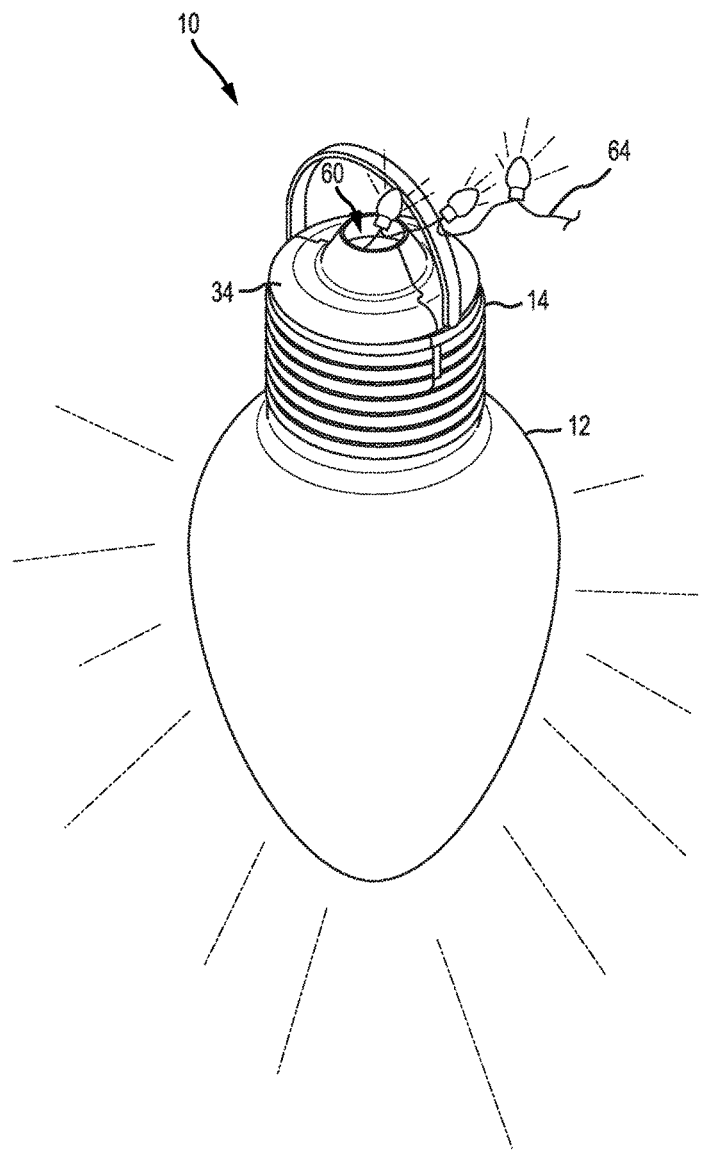
FIG. 8 is a perspective view of an example light bulb storage container and display, with a string of decorative lights disposed partially within the container.

The apparatus 10 may have numerous uses. In a first use, the apparatus 10 may be used as a display for seasonal or holiday lights, or other items. For example, FIG. 8 illustrates a configuration in which a strand of decorative lights 64 may be partially disposed within the apparatus 10. To arrive at such a configuration, for example, a user may open the lid assembly 14 and insert a portion of a string of lights into the interior 22 of the housing 12. The string may be extended through the openings 24, 60 of the housing neck portion 20 and of the lid assembly 14, and the movable portion 34 of the lid assembly 14 may be closed such that the light string extends through the aperture formed by the gasket and so the light strand can be coupled with a power source on an exterior of the apparatus. In an embodiment in which the gasket is made of one or more pieces of compressible material 48, 50, such a compressible material may reduce the likelihood that closing the lid assembly 14 around one or more light bulbs will damage the light bulbs. The light bulb container and storage display apparatus 10 may thus house a portion of a strand of lights that, when turned on, illuminate the housing to produce a pleasing and decorative glow. Using the handle 16, the user can hang the light bulb storage display 10 along roofs, gutters, trees, or other structures. The light bulb container and storage display 10 may be suitable for outdoor use, including inclement weather such as rain, by allowing water to flow out through the aperture 28 in the bottom of the housing.

In a second use, the light bulb container and storage display 10 may be used to store seasonal or holiday lights, or other items. If the interior 22 of the housing 12 includes a sufficient volume, a user can store one or more strands of lights completely within the apparatus 10. The user may remove the lid assembly 14 from the housing (e.g., by unscrewing the lid assembly 14 from the neck portion 20), place the strand(s) within the interior 22, and replace the lid assembly 14 on the housing 12 to store the strand(s) inside.

In addition to the specific uses of the apparatus 10 disclosed herein, the lid assembly 14 of the instant disclosure provides a new and useful means for enclosing a storage container. In particular, the arrangement of the hinge 38 in a parallel configuration with the axis N of the housing allows for the lid assembly 14 to be opened and closed while attached to the housing without altering the vertical footprint of the apparatus 10. In addition, the inclusion of a movable portion 34 and a fixed portion 32 allows for a strand of lights or other object to be easily inserted so as to be partially disposed inside of the interior 22 and partially disposed outside of the apparatus 10. Further, the separation of the mating portion 46 of the lid assembly 14 from the movable portion 34 of the lid assembly 14 allows for multiple configurations in which access to the interior 22 of the housing 12 can be provided. For example, in one configuration, the lid assembly 14 may be removed entirely to provide a larger access opening to the user to access the interior 22. In another configuration, the movable portion 34 of the lid assembly 14 can be opened while the lid assembly 14 remains attached to the housing to provide a smaller access opening which can be easily closed via hinge 38 and clasp 40. Other advantages will be apparent to a person of skill in the art.

While this disclosure has described certain embodiments, it will be understood that the claims are not intended to be limited to these embodiments. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

What is claimed is:

1. An apparatus comprising:
   a housing comprising:
     a hollow body portion defining an interior and having an upper end and a lower end; and
     a neck portion extending from the upper end of the body portion, the neck portion defining an axis that extends through the upper and lower ends of into the body portion, the neck portion further defining a housing opening for accessing the interior; and
   a lid assembly configured to be removably coupled with the housing, the lid assembly comprising:
     a fixed portion configured to be removably coupled with the housing; and a movable portion movably coupled with the fixed portion,
     wherein the movable portion is movable relative to the fixed portion from an open configuration to a closed configuration;
     wherein the lid assembly defines a lid opening, in both the open and closed configuration, that is contiguous with the housing opening and provides access to the interior when the lid assembly is coupled with the housing;
     wherein the opening is larger in the open configuration than in the closed configuration;
   wherein the movable portion is hingedly coupled with the fixed portion along a hinge axis that is substantially parallel with the axis of the neck portion when the lid assembly is coupled with the housing;
   wherein the body portion of the housing defines an aperture at the lower end of the body portion to permit drainage of fluid from the interior.

2. The apparatus of claim 1, wherein:
   the neck portion comprises a first mating structure; and
   the lid assembly comprises a second mating structure configured to directly couple with the first mating structure so as to secure the lid assembly to the neck portion.

3. The apparatus of claim 2, wherein the first and second mating structures comprise complementary threaded portions.

4. The apparatus of claim 1, further comprising a clasp, disposed on the movable portion or the fixed portion of the lid assembly, configured to selectively engage with a protrusion or recess on the other of the movable portion or the fixed portion, to secure the movable portion to the fixed portion in the closed configuration.

5. The apparatus of claim 1, wherein the interior has a volume of between a quarter gallon and a gallon.

6. The apparatus of claim 1, wherein the body portion comprises a conical lower portion shaped so as to encourage drainage of fluid from the interior through the aperture.

7. The apparatus of claim 1, wherein the neck portion axis extends through the aperture.

8. The apparatus of claim 1, further comprising a handle secured to the lid assembly.

9. The apparatus of claim 8, wherein the handle is rotatably coupled to the lid assembly along a rotation axis, wherein the handle rotation axis is substantially perpendicular to the neck portion axis.

10. The apparatus of claim 1, wherein the housing comprises a plastic material.

11. The apparatus of claim 1, wherein the lid assembly comprises a plastic material.

12. The apparatus of claim 1, wherein the housing is at least partially translucent or transparent.

13. The apparatus of claim 1, wherein the housing at least permits the transmission of light.

14. An apparatus comprising:
  a housing comprising:
    a hollow body portion defining an interior; and
    a neck portion extending from an upper end of the body portion, the neck portion defining an axis that extends into the body portion, the neck portion further defining a housing opening for accessing the interior;
  a lid assembly configured to be removably coupled with the housing, the lid assembly comprising:
    a fixed portion configured to be removably coupled with the housing; and a movable portion movably coupled with the fixed portion,
    wherein the movable portion is movable relative to the fixed portion from an open configuration to a closed configuration;
    wherein the lid assembly defines a lid opening, in both the open and closed configuration, that is contiguous with the housing opening and provides access to the interior when the lid assembly is coupled with the housing;
  wherein the opening is larger in the open configuration than in the closed configuration;
  a first piece of compressible material secured to an inner surface of the fixed portion of the lid assembly; and
  a second piece of compressible material secured to an inner surface of the movable portion of the fixed assembly;
  wherein the first and second pieces of compressible material collectively define an aperture that provides access to the interior.

15. The apparatus of claim 14, wherein the aperture is contiguous with the opening defined by the neck portion.

* * * * *